(12) United States Patent
Jung et al.

(10) Patent No.: US 11,259,202 B2
(45) Date of Patent: *Feb. 22, 2022

(54) METHOD AND APPARATUS FOR TRANSMITTING A RACH PREAMBLE ON A WIRELESS NETWORK

(71) Applicant: Motorola Mobility LLC, Chicago, IL (US)

(72) Inventors: Hyejung Jung, Palatine, IL (US); Vijay Nangia, Woodridge, IL (US); Prateek Basu Mallick, Langen (DE); Joachim Löhr, Wiesbaden (DE); Ravi Kuchibhotla, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/033,936

(22) Filed: Sep. 28, 2020

(65) Prior Publication Data
US 2021/0014715 A1   Jan. 14, 2021

Related U.S. Application Data

(63) Continuation of application No. 15/970,720, filed on May 3, 2018, now Pat. No. 10,820,225.
(Continued)

(51) Int. Cl.
*H04W 24/10* (2009.01)
*H04W 56/00* (2009.01)
(Continued)

(52) U.S. Cl.
CPC ........... *H04W 24/10* (2013.01); *H04W 24/08* (2013.01); *H04W 48/10* (2013.01);
(Continued)

(58) Field of Classification Search
CPC ..... H04W 24/10; H04W 24/08; H04W 48/10; H04W 56/001; H04W 72/005;
(Continued)

(56) References Cited

U.S. PATENT DOCUMENTS 10,440,731 B2   10/2019   Fan et al.
10,511,420 B2   12/2019   Kim et al.
(Continued)

FOREIGN PATENT DOCUMENTS

AU   2017387480 A1   7/2019
CN   110050452 A   7/2021
(Continued)

OTHER PUBLICATIONS

Nowlin, "Notice of Allowance", PTO-892, U.S. Appl. No. 15/970,706 U.S. Patent and Trademark Office, dated Sep. 27, 2021.

*Primary Examiner* — Samina F Choudhry
(74) *Attorney, Agent, or Firm* — Loppnow & Chapa; Matthew C. Loppnow

(57) ABSTRACT

A first configuration of a first set of random access channel occasions can be received in a handover command message from a first cell. A second configuration of a second set of random access channel occasions of a second cell can be received. System information of the second cell can include the second configuration of the second set of random access channel occasions. A random access channel preamble can be transmitted on a random access channel occasion. The first set of random access channel occasions and/or the second set of random access channel occasions can include the random access channel occasion.

20 Claims, 10 Drawing Sheets

Related U.S. Application Data

(60) Provisional application No. 62/502,400, filed on May 5, 2017.

(51) Int. Cl.
*H04W 24/08* (2009.01)
*H04W 72/04* (2009.01)
*H04W 72/00* (2009.01)
*H04W 74/00* (2009.01)
*H04W 48/10* (2009.01)
*H04W 74/08* (2009.01)
*H04W 48/12* (2009.01)

(52) U.S. Cl.
CPC ....... *H04W 56/001* (2013.01); *H04W 72/005* (2013.01); *H04W 72/0446* (2013.01); *H04W 74/002* (2013.01); *H04W 74/0833* (2013.01); *H04W 48/12* (2013.01)

(58) Field of Classification Search
CPC ........... H04W 72/0446; H04W 74/002; H04W 74/0833; H04W 48/12
See application file for complete search history.

(56) References Cited

U.S. PATENT DOCUMENTS

| | | | |
|---|---|---|---|
| 10,582,441 | B2 | 3/2020 | Yi et al. |
| 10,939,399 | B2 | 3/2021 | Yokomakura et al. |
| 11,057,883 | B2 | 7/2021 | Shimezawa |
| 11,102,739 | B2 | 8/2021 | Harada et al. |
| 2017/0331577 | A1* | 11/2017 | Parkvall .................. H04W 4/00 |
| 2018/0035421 | A1* | 2/2018 | Lin .................. H04W 74/0833 |
| 2018/0110063 | A1 | 4/2018 | Fan et al. |
| 2018/0159671 | A1 | 6/2018 | Kim et al. |
| 2018/0160361 | A1 | 6/2018 | Yi et al. |
| 2018/0176065 | A1 | 6/2018 | Deng et al. |
| 2018/0279229 | A1* | 9/2018 | Dinan ................. H04W 52/367 |
| 2019/0082412 | A1 | 3/2019 | Zander et al. |
| 2019/0373570 | A1 | 12/2019 | Yokomakura et al. |
| 2020/0059876 | A1 | 2/2020 | Zhang |
| 2020/0119800 | A1 | 4/2020 | Rune et al. |
| 2020/0137701 | A1 | 4/2020 | Harada et al. |
| 2020/0305151 | A1 | 9/2020 | Shimezawa |

FOREIGN PATENT DOCUMENTS

| | | |
|---|---|---|
| EP | 3565204 A1 | 11/2019 |
| MX | 2019007747 A | 10/2019 |
| WO | 2018123468 A1 | 5/2018 |

* cited by examiner

METHOD AND APPARATUS FOR TRANSMITTING A RACH PREAMBLE ON A WIRELESS NETWORK

BACKGROUND

1. Field

The present disclosure is directed to a method and apparatus for transmitting a RACH preamble on a wireless network.

2. Introduction

Presently, wireless communication devices, such as user equipment, communicate with other communication devices using wireless signals. When a Network Entity (NE), such as a Base Station (BS) or gNodeB (gNB), can create a number of narrow beams using a large number of antenna elements, the NE may transmit more than one Synchronization Signal (SS) block per period. Each SS block carries Primary and Secondary Synchronization Signals (PSS/SSS) and a Physical Broadcast Channel (PBCH) which may be Transmit (Tx) beamformed. A SS burst set including one or more SS blocks, such as up to 64 SS blocks, may cover different intended spatial directions.

With potentially transmitting multiple SS blocks according to a predefined pattern for SS block locations, the NE may need to provide a User Equipment (UE) with SS block timing information, such as an index of a given SS block of the SS burst set, and/or SS burst set timing information, such as an index of the SS burst set. After detecting at least one SS block associated with NE Tx beams for the UE, the UE can determine full or partial timing information, by using at least the knowledge on the predefined potential SS block locations, such as SS block locations assumed by the UE, and the received SS block timing information. The full or partial information can include symbol timing, such as a symbol boundary, can include slot timing, such as a slot boundary, and can include frame timing, such as a frame boundary.

For mobility measurement and reporting, the UE may perform mobility measurement for one or more SS blocks in the SS burst set based on signals in each SS block, such as SSS and/or Demodulation Reference Signal (DMRS) of the PBCH. Further, a measurement report may include measurement quantities, such as Reference Signal Received Power (RSRP), of detected and measured one or more SS blocks and corresponding SS block indices.

In Long Term Evolution (LTE), a RACH configuration index, such as Table 5.7.1-2/3/4 in 3GPP TS 36.211, determines the RACH preamble format and the time and frequency resources for the RACH preamble. In fifth generation (5G) new RAT, support of dynamic Time Division Duplex (TDD) operation and potential Ultra-Reliable Low-Latency Communication (URLLC) services make it difficult to predefine an uplink slot or the number of uplink symbols in a slot. Accordingly, semi-static configuration of RACH time and frequency resources may not be sufficient for flexible radio resource utilization.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Some embodiments can provide a method and apparatus for communicating on a wireless network. According to a possible embodiment, a SS of a SS block of a SS burst set can be received. A measurement can be performed at least on the received SS of the SS block. A PBCH of the SS block can be received. The PBCH can include a first portion of the PBCH and a second portion of the PBCH. The first portion of the PBCH can carry at least a part of minimum system information. The second portion of the PBCH can carry timing information. The timing information can include information including at least an indication of a SS block index of the SS block within the SS burst set. The second portion of the PBCH can be demodulated and decoded. The SS block index of the SS block within the SS burst set can be determined at least based on the demodulating and decoding. A measurement report can be transmitted. The measurement report can include a measurement quantity from the measurement on the received SS of the SS block and can include the determined SS block index.

According to another possible embodiment, an indication of a set of semi-statically configured RACH resources can be received via a higher layer signaling. The higher layer can be higher than a physical layer. An indication of availability of a RACH resource of at least one RACH resource of the set of semi-statically configured RACH resources can be received via a dynamic physical-layer signaling. The dynamic physical-layer signaling can be within a number of slots including a RACH slot. The RACH slot can include the at least one RACH resource of the set of semi-statically configured RACH resources. An available RACH resource in the RACH slot can be determined based on the received indication of the set of semi-statically configured RACH resources and based on the received indication of availability of the RACH resource of the at least one RACH resource of the set of semi-statically configured RACH resources. A RACH preamble can be transmitted on the available RACH resource in the RACH slot.

Figure 1:
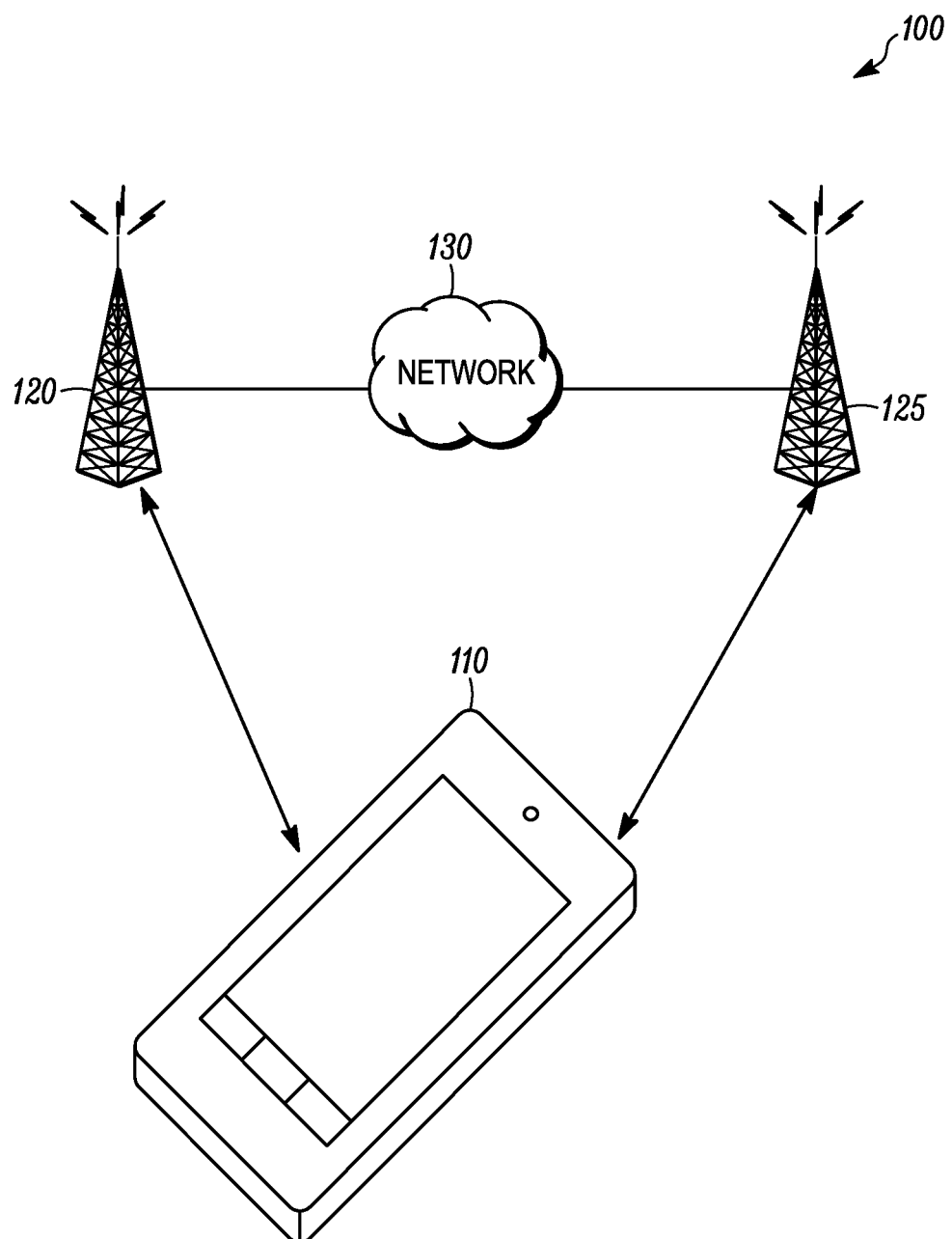
FIG. 1 is an example block diagram of a system according to a possible embodiment.

FIG. 1 is an example block diagram of a system 100 according to a possible embodiment. The system 100 can include a User Equipment (UE) 110, at least one network entity 120 and 125, such as a base station, and a network 130. The UE 110 can be a wireless wide area network device, a user device, wireless terminal, a portable wireless communication device, a smailphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and 125 can be wireless wide area network base stations, can be NodeBs, can be enhanced NodeBs (eNBs), can be New Radio (NR) NodeBs (gNBs), such as 5G NodeBs, can be unlicensed network base stations, can be access points, can be base station controllers, can be network controllers, can be Transmission/Reception Points (TRPs), can be different types of base stations from each other, and/or can be any other network entities that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

Methods can be used to transmit a PBCH with supporting both wideband and narrowband UEs. Two different SS block transmission modes can be used depending on a cell operating mode and/or deployment scenarios and related configuration signaling. Embodiments can provide an efficient way to deliver the SS timing information in a PBCH to a UE without requiring full decoding of the PBCH.

Embodiments can further provide SS timing indication and RACH resource configuration. Some embodiments can provide for transmitting SS timing information, such as a SS block index and/or a SS burst set index, in a PBCH that does not mandate a UE to decode a neighbor cell's Master Information Block (MIB) before handover and supports combining multiple PBCHs within a PBCH Transmit Time Interval (TTI) to achieve reliable PBCH decoding. Some embodiments can provide for accommodating adaptation of SS burst set periodicities, such as 5, 10, 20, 40, 80, and 160 ms, with a fixed PBCH TTI. Some embodiments can provide for flexibly determining RACH time and frequency resources with support of dynamic TDD operation.

If SS block timing information bits, such as a SS block index within a SS burst set, are encoded together with other minimum System Information (SI) bits carried by PBCH, the information bits for PBCH may be different for every SS block within the SS burst set. Furthermore, if more than one SS burst set can be transmitted per PBCH TTI and if their timing information, such as a SS burst set index within PBCH TTI, is also explicitly indicated and encoded together with the other SI in PBCH, then the number of Broadcast Channel (BCH) Transport Blocks (TBs), at least differing in the timing information, per PBCH TTI can be very large. For example, the number of BCH TBs can be up to the maximum number of SS blocks within the SS burst set multiplied by the maximum number of SS burst sets per PBCH TTI. This may significantly increase PBCH encoding complexity at a Network Entity (NE), such as a gNodeB, and may negatively impact network power consumption. In addition, it may be difficult or not feasible for a UE to combine multiple PBCHs within a given SS burst set and across SS burst sets within the PBCH TTI for reliable PBCH decoding. Thus, the PBCH resource may have to be overprovisioned to achieve a certain target coverage, which potentially leads to a larger PBCH resource overhead. Furthermore, a UE in a Radio Resource Control (RRC) connected mode may have to perform full PBCH decoding for every detected neighbor cell, in order to report measurement quantities together with corresponding SS block indices. Mandating the RRC connected UE to decode the entire PBCH from a neighbor cell to perform mobility measurement and report can result in a longer measurement gap or delay due to UE's full decoding of the PBCH. In addition, decoding PBCH for every detected cell can increase UE power consumption.

Implicit indication of the SS block timing information, such as use of different PBCH redundancy versions, can allow a UE to combine multiple PBCHs within the SS burst set. Accordingly, a UE can improve PBCH demodulation performance. However, the method of implicit indication may still require full PBCH decoding to obtain SS timing information.

Figure 2:
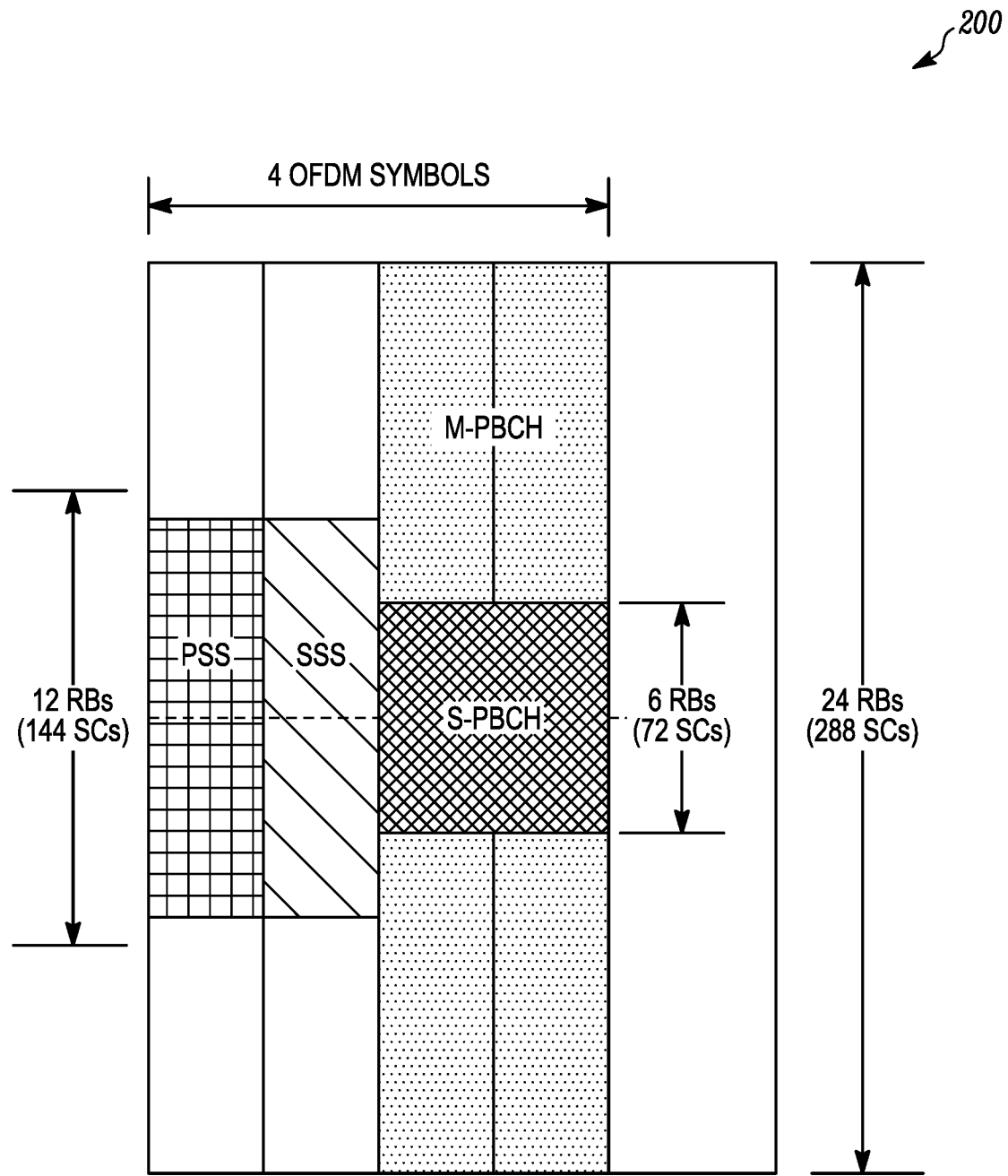
FIG. 2 is an example illustration of SS Timing Information Block (STIB) and Master Information Block (MIB) RE mapping on PBCH according to a possible embodiment.

FIG. 2 is an example illustration 200 of SS Timing Information Block (STIB) and MIB RE mapping on PBCH according to a possible embodiment. A PBCH can carry two information blocks, such as a STIB and a MIB. Also, each information block can be separately encoded, modulated to a separate set of Quadrature Amplitude Modulation (QAM), such as Quadrature Phase Shift Keying (QPSK), symbols, and mapped to a different set of Resource Elements (REs) in the PBCH. The set of REs assigned for the MIB in the PBCH can be denoted as M-PBCH REs, and another set of REs assigned for the STIB can be denoted as S-PBCH REs, where M-PBCH can carry MIB and S-PBCH can carry STIB. The M-PBCH REs and S-PBCH REs can be mutually exclusive. Resource partition between M-PBCH and S-PBCH in the PBCH can be dependent on the sizes of MIB and STIB and required code rates of S-PBCH and M-PBCH in each SS block, taking into account different combining levels for M-PBCH and S-PBCH. For example, a S-PBCH carrying 6-bit STIB can occupy 144 REs over 72 Subcarriers (SCs), and M-PBCH carrying 50-bit MIB can occupy 432 REs over 288 SCs minus the SCs for the STIB, as shown in the illustration 200. The S-PBCH REs and/or M-PBCH REs can be mapped on to one or more OFDM symbols, such as 2 OFDM symbols. In one example, the S-PBCH REs can be mapped on one symbol following the SSS while M-PBCH REs can be mapped to multiple OFDM symbols. In another example, the S-PBCH REs can be mapped only to REs within the frequency band/region corresponding to the PSS/SSS. Assuming QPSK modulation, the example RE allocation can result in a code rate of 0.021 for S-PBCH and a code rate of 0.058 for M-PBCH, in one SS block. With combining of 3 or more M-PBCHs, a UE can achieve similar decoding performances for M-PBCH and S-PBCH. Additionally, the number of REs allocated for S-PBCH can be determined such that STIB decoding performance in a given SS block can be similar to or better than a one-shot detection rate of PSS/SSS. Alternatively, M-PBCH REs can partially or fully overlap with S-PBCH REs, and a UE can first decode S-PBCH and cancel the S-PBCH interference to decode M-PBCH.

Figure 3:
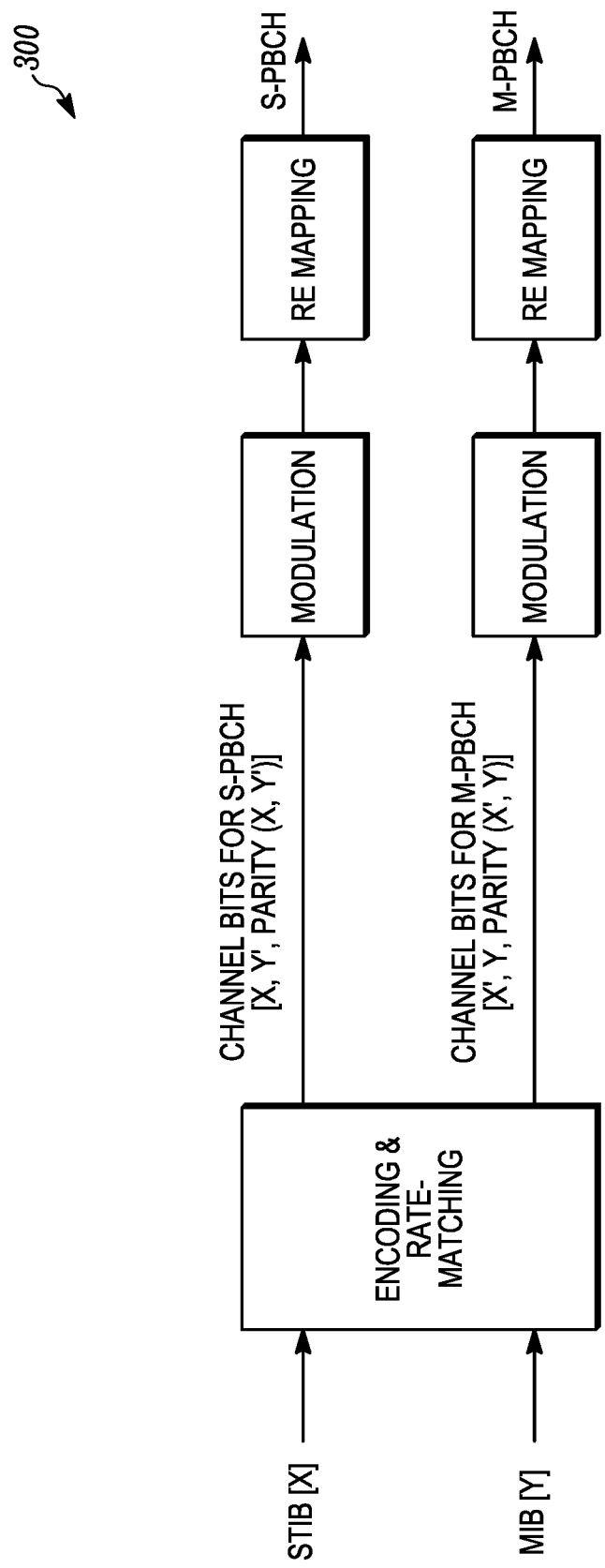
FIG. 3 is an example, illustration of joint encoding of STIB and MIB according to a possible embodiment.

FIG. 3 is an example, illustration 300 of joint encoding of STIB and MIB according to a possible embodiment. The STIB and MIB can be jointly encoded, but the resulting channel bits can be separated into two self-decodable units, where a UE can decode the STIB from a first unit and can decode the MIB from a second unit. The first unit can include at least the STIB as systematic bits and can include a fractional part of the MIB and parity bits that are generated by using the STIB and the fractional part of the MIB. In one example, the parity bits included in the first unit can be a portion of the jointly coded parity bits that are primarily based on the STIB systematic bits and an optional fractional part of the MIB. For example, the parity bits can have significant contribution from the STIB systematic bits and optional fractional part of the MIB included in first unit. The second unit can include at least the MIB as systematic bits and may include a full or part of the STIB and parity bits resulting from the MIB and the full or part of the STIB. In another example, the second unit can include at least the remaining portion of the jointly coded bits that have not been included in the first unit, such as at least the portion of the MIB systematic bits, and at least the portion of the jointly coded parity bits not included in the first unit. The first and second units can be modulated to different sets of modulation symbols and mapped to different sets of REs in the PBCH. The illustration 300 shows joint encoding of STIB and MIB. S-PBCH can represent the set of REs corresponding to first unit, and M-PBCH can represent the set of REs corresponding to second unit.

According to another possible embodiment, the STIB and MIB can be jointly encoded resulting in encoder output of a systematic bit stream, such as STIB and MIB, and a parity bit stream. At least the systematic bits corresponding to the STIB and a first portion of the parity bits from the parity bit stream can be QAM, such as QPSK, modulated and mapped to a first set of REs, such as S-PBCH REs, of the PBCH REs. The first portion of the parity bits can correspond to parity bits that have a significant contribution from at least the STIB systematic bits. The remaining portion of the systematic bit stream and parity bit stream not included in the first set of REs can be QAM, such as QPSK, modulated and mapped to the remaining REs of the PBCH, such as M-PBCH REs. This remaining portion may or may not be self-decodable. In one example, at least the systematic bits corresponding to the MIB and a second portion of the parity bits from the parity bit stream can be QAM, such as QPSK, modulated and mapped to the remaining REs of the PBCH. The second portion of the parity bits can correspond to the parity bits of the parity bit stream not included in the first portion of the parity bits.

According to a possible embodiment, at least the STIB bits can be mapped to a portion of the joint encoder input information bit stream that have equal or higher reliability relative to the other information bits in the information bit stream. For, example, the joint encoder can be a polar code and the STIB bits can be mapped to virtual channels of the polar code that have equal or lower error probability compared to the remaining virtual channels of the polar code.

According to a possible embodiment, the STIB and MIB can have separate Cyclic Redundancy Check (CRC) parity bits. In another possible embodiment, joint CRC parity bits can be computed from both the STIB and MIB bits. In another possible embodiment, CRC can only be based on MIB bits.

Separate encoding of SS timing information from a MIB or joint encoding of the SS timing information and the MIB, such as generation of two self-decodable units carrying different systematic bits from joint decoding, can allow a UE to not perform full decoding of PBCH for neighbor cell measurement and reporting. Furthermore, a UE can combine multiple M-PBCHs for MIB decoding, which can increase reliability of MIB decoding.

The MIB can include at least a part of a System Frame Number (SFN) and can include other minimum system information. The minimum system information can refer to essential system information that UE may need to acquire to access to a cell or a network. The MIB size including CRC bits can be smaller than 100 bits. According to a possible embodiment, the SFN can be a number between 0 and 1023 indicating an index of a 10 ms radio frame. The STIB can include at least a SS block index and can further include a part of SFN and/or a SS burst set index. The size, such as the number of bits, of the STIB can be determined by the maximum number of SS blocks within a SS burst set and by the maximum number of SS burst sets whose indices are explicitly indicated by the STIB. For example, if the MIB carries the 7 Most Significant Bits (MSBs) out of 10-bit SFN, the PBCH TTI is 80 ms, the maximum number of SS blocks per SS burst set is 64, and the minimum SS burst set periodicity is 5 ms, then the STIB can carry at least 6 bits for the SS block index and can be up to 10 bits, such as 6 bits for the SS block index and 4 bits for the SS burst set index within the PBCH TTI.

Alternative embodiments can be used for information elements of the STIB. One embodiment for information elements of the STIB can use a SS block index, such as 6 bits, within a SS burst set to support up to 64 SS blocks. A UE can combine multiple S-PBCHs across SS burst sets. According to a possible implementation, a SS burst set index within a PBCH TTI assuming the smallest SS burst set periodicity can be included in the MIB and can be jointly encoded with the other SI in the MIB. This can allow a UE to combine multiple M-PBCHs within a SS burst set, but the UE may not combine M-PBCHs across multiple SS burst sets. In some examples, the UE may be able to combine a portion of the M-PBCHs across multiple SS burst sets, such as depending on how the joint encoding is performed.

According to another possible implementation, a SS burst set index within the PBCH TTI, assuming the default SS burst set periodicity, can be included in the MIB and jointly encoded with the other SI in the MIB. This can allow a UE to combine multiple M-PBCHs across multiple SS burst sets within the default SS burst set periodicity, if the SS burst set periodicity is configured to be smaller than the default SS burst set periodicity. A SS burst set index within the default SS burst set periodicity can be implicitly indicated. In one example, different scrambling sequences can be applied to M-PBCHs for different SS burst sets within the default SS burst set periodicity. In another example, PSS or SSS sequences can be used to indicate the SS burst set index within the default SS burst set periodicity. In another example, one or more of different scrambling sequences applied to M-PBCHs, redundancy version of M-PBCH, PSS, SSS sequences, or combination thereof can be used to indicate the different SS burst sets within the default SS burst set periodicity. The scrambling sequence may be generated from a scrambling code generator such as a gold code generator. The scrambling code generator may be (re)initialized every default SS burst set periodicity or PBCH TTI. In one example, there may be only one SS burst set with the default SS burst set periodicity. In various examples, the same scrambling sequence may be used for all M-PBCH within a SS burst set. In some examples, the same redundancy version of M-PBCH may be used for all M-PBCH within a SS burst set.

Figure 4:
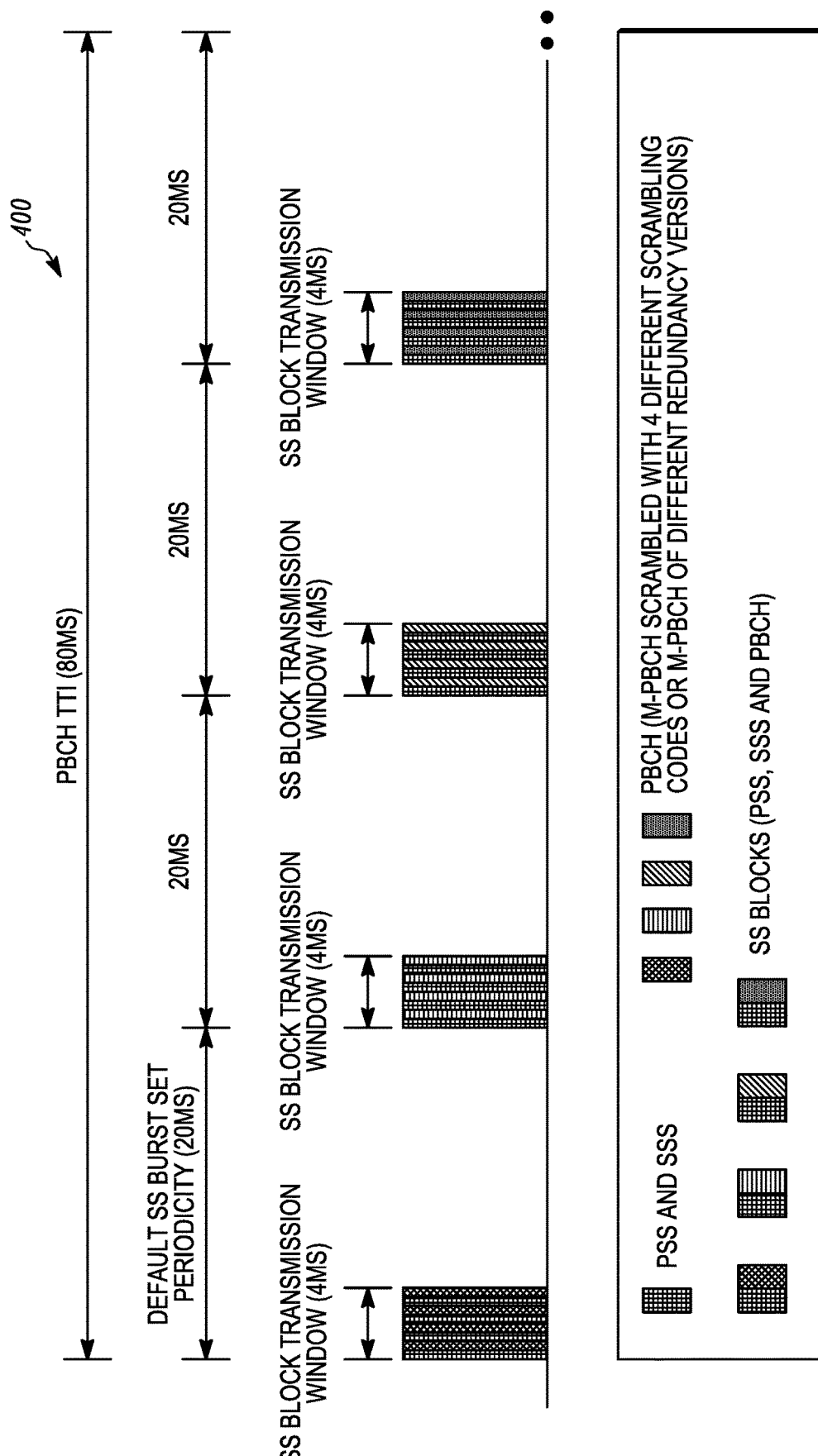
FIG. 4 is an example illustration of PBCH mapping within the PBCH TTI where the SS burst set periodicity is set to 20 ms and the PBCH TTI is set to 80 ms according to a possible embodiment.
Figure 5:
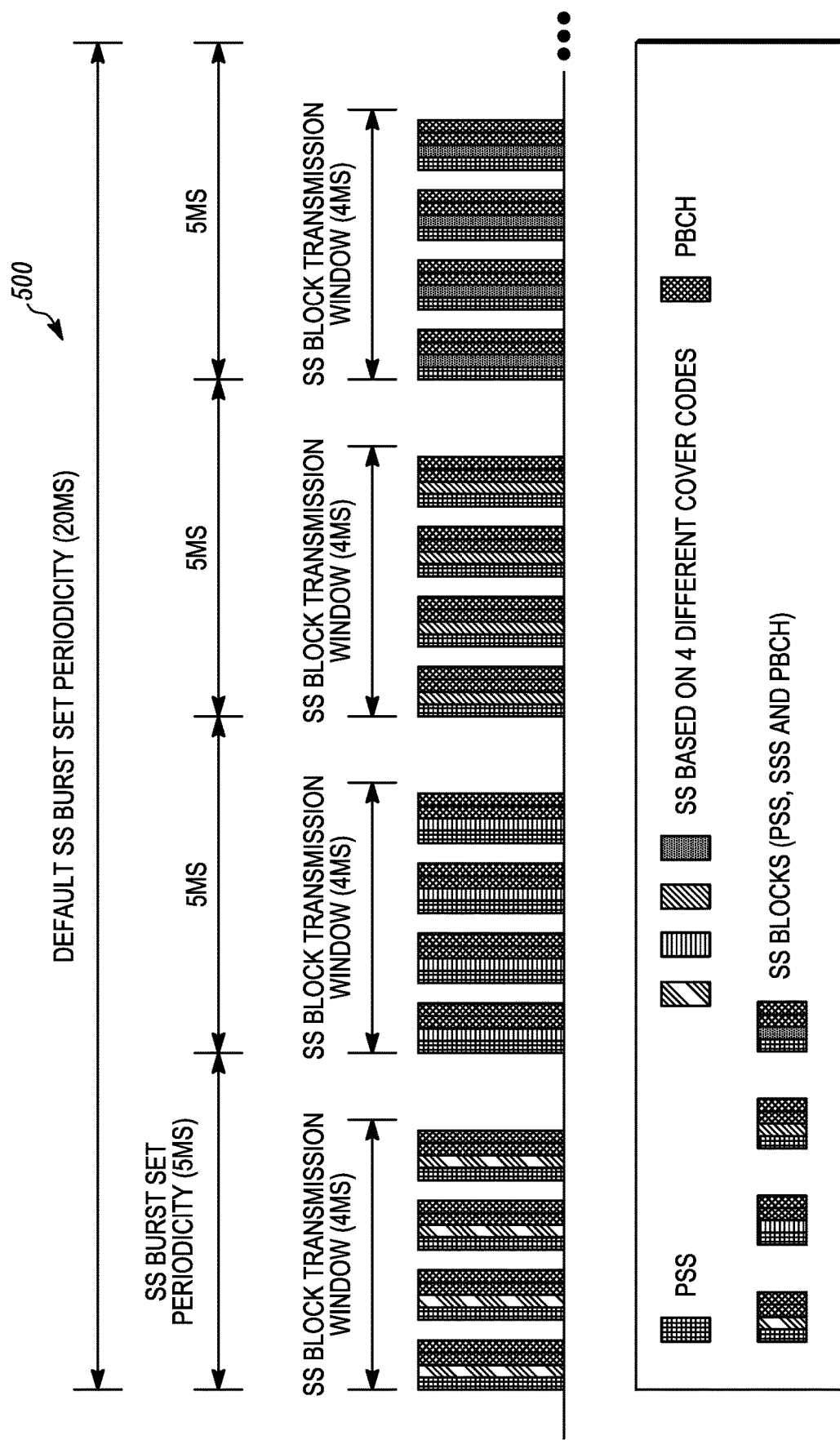
FIG. 5 is an example illustration of SSS mapping within 20 ms default SS burst set periodicity where the SS burst set periodicity is set to 5 ms according to a possible embodiment.

FIG. 4 is an example illustration 400 of PBCH mapping within the PBCH TTI where the SS burst set periodicity is set to 20 ms and the PBCH TTI is set to 80 ms according to a possible implementation. FIG. 5 is an example illustration 500 of SSS mapping within 20 ms default SS burst set periodicity where the SS burst set periodicity is set to 5 ms according to a possible implementation. A SS burst set index within a PBCH TTI may not be included in the MIB but can be indicated implicitly. In one example, different scrambling sequences and/or a different redundancy version can be applied to M-PBCHs per the default SS burst set periodicity within the PBCH TTI as shown in the illustration 400. The PSS or SSS sequences can be used to indicate the SS burst set index within the default SS burst set periodicity as shown in the illustration 500. A UE can combine multiple M-PBCHs across multiple SS burst sets within the PBCH TTI. In various examples, the same scrambling sequence may be used for all M-PBCH within a default SS burst set periodicity. In some examples, the same redundancy version of M-PBCH may be used for all M-PBCH within a default SS burst set periodicity.

Another embodiment for information elements of the STIB can use a SS block index within a SS burst set, such as 6 bits, and use a SS burst set index within a PBCH TTI assuming the default SS burst set periodicity, such as 2 bits for the case of 80 ms PBCH TTI and the default SS burst set periodicity of 20 ms. A UE can combine multiple S-PBCHs across SS burst sets within the default SS burst set periodicity.

Another embodiment for information elements of the STIB can use a SS block index within a SS burst set, such as 6 bits, and use a SS burst set index within a PBCH TTI assuming the smallest SS burst set periodicity, such as 4 bits for the case of 80 ms PBCH TTI and the smallest SS burst set periodicity of 5 ms. A UE can combine multiple S-PBCHs across the PBCH TTIs.

Another embodiment for information elements of the STIB can use a SS block index within a SS burst set, such as 6 bits, and use a radio frame index within a PBCH TTI, such as 3 bits for the case of 80 ms PBCH TTI. With 5 ms SS burst set periodicity, the SSS can indicate frame timing boundary. A UE can combine multiple S-PBCHs across SS burst sets within a radio frame.

According to another possible embodiment, modulated symbols for STIB can be mapped to a sub-band overlapping in the frequency domain with the sub-band where PSS/SSS are transmitted. Then, a UE can operate with the bandwidth the same as the PSS/SSS bandwidth for inter-frequency neighbor cell measurement. If the bandwidth of the PBCH is larger than the PSS/SSS bandwidth, the above described mapping of S-PBCH symbols in the frequency domain can allow UE to operate with the smaller bandwidth than the PBCH bandwidth for neighbor cell measurement. This can reduce UE power consumption.

In the example illustration 200 described above, a PBCH bandwidth can correspond to a bandwidth of 288 consecutive subcarriers and the PBCH can span 2 OFDM symbols within a SS block, while the bandwidth for the PSS and the SSS can correspond to a bandwidth of 144 consecutive subcarriers. Similar to PSS/SSS, the PBCH can be transmitted with predefined subcarrier spacing and a predefined transmission bandwidth. The S-PBCH can be mapped to the center 72 subcarriers of the 2 OFDM symbols of the PBCH resource.

According to another possible embodiment, a UE receiver can combine channel bits for STIB only across SS burst sets, and the gNodeB can transmit the STIB with low code rate by allocating overprovisioned resource elements for S-PBCH. According to an alternative possible embodiment, a part of the STIB can be encoded, such as 4 MSBs out of 6 bits, and information corresponding to the remaining Least Significant Bits (LSB) can be implicitly indicated with scrambling sequences applied to channel bits of S-PBCH. Then, a UE can combine a couple of S-PBCHs from consecutive SS blocks within the SS burst set and can potentially exploit beam diversity.

According to a possible embodiment, the MIB can have 50 bits including CRC bits. The DL bandwidth for 2 bits can be 25, 50, 75, or 100 Resource Blocks (RBs). The number of RBs can be a function of the carrier frequency band and the 2 bits may map to a different set of RBs for a different frequency band. For example, 100, 200, 300, or 400 RBs can be used for 28-40 GHz frequency band. The MIB can include a part of system frame number information, such as 7 bits. The MIB can include information regarding remaining minimum SI transmission, such as 10 bits. The MIB can include configuration information for a Physical Downlink Control Channel (PDCCH) scheduling a Physical Downlink Shared Channel (PDSCH) carrying the remaining minimum SI. The configuration information can include a frequency distance from a SS raster, such as a center frequency of PSS/SSS, to a starting subcarrier of a Common Control Channel Resource Set (CORESET), which can be used for scheduling a common PDSCH. The configuration information can include the size of the common CORESET in terms of the number of symbols and the number of Resource Block Groups (RBGs). The configuration information can include the location, such as PRBs or RBGs, of the common CORESET. The MIB can include SS block transmission mode, such as 1 bit. The MIB can include 14 spare bits. The MIB can include CRC, such as 16 bits.

According to a possible embodiment for Random Access Channel (RACH) configuration, a UE can determine a RACH time and frequency resource based on combination of semi-static configuration signaling and dynamic indication signaling. Semi-static RACH time and frequency resources can be cell-specifically configured, and a gNodeB can indicate the actual availability of the semi-statically configured RACH resources via Downlink Control Information (DCI) in a RACH slot or near the RACH slot, such as one or two slots before the RACH slot. The RACH slot can include one or more semi-statically configured common, such as cell-specific, RACH resources. Considering that the number of available uplink symbols in a slot may change in a slot basis, the UE may have to adjust a preamble format in each RACH slot.

According to a possible implementation, information for RACH resources can be indicated to UE via a semi-static configuration signaling. For example, the rate of occurrence of RACH slots and a starting RACH slot index can be indicated. Alternatively, a set of RACH slots can be indicated. Also, the number of RACH occasions in the frequency domain per RACH slot (or at a given time instance) for a set of SS blocks, such as equivalent to a set of gNodeB transmit beams, associated with the same RACH time/frequency resource can be indicated. This may be related to the averaged and/or expected number of RACH attempts on the RACH resources associated with the set of SS blocks. Additionally, the number of RACH occasion sets in the frequency domain per RACH slot (or at a given time instance) can be indicated. Each RACH occasion set comprising one or more RACH occasions can be associated with a set of SS blocks or a set of gNodeB transmit beams. This may be related to gNodeB antenna and/or beamforming architecture, such as a number of Radio Frequency (RF) chains. Furthermore, one or more RACH preamble formats can be indicated. Each preamble format can determine the number of RACH OFDM/SC-FDMA symbols per RACH preamble, the number of RACH preambles per RACH preamble format, a cyclic prefix (CP) length, and a guard time duration. Since the number of available uplink symbols in a slot can vary dynamically, a couple of RACH preamble formats, each of which may have a different number of RACH preambles and/or a different number of RACH OFDM/SC-FDMA symbols per RACH preamble, may need to be semi-statically configured.

Information for RACH resources can be indicated via dynamic signaling, such as DCI in group-common PDCCH. The group common PDCCH can be Tx beamformed with Tx beams that are associated with an addressed RACH resource. Equivalently, the group common PDCCH can be spatially quasi-co-located with a SS block and/or a CSI-RS resource which can be associated with the addressed RACH resource. Then, UEs selecting the addressed RACH resource based on downlink Tx beam selection (equivalently, SS block and/or CSI-RS resource selection) can receive and decode the group common PDCCH and determine whether to transmit RACH preamble(s) or not on the addressed RACH resource. Whether the configured potential RACH resource in a slot is available or not can be indicated via explicit or implicit indication. Starting and ending locations, such as a starting symbol index and an ending symbol index, of RACH resources or uplink OFDM/SC-FDMA symbols within a slot can also be indicated. Alternatively, an indication of RACH preamble format selected from the configured RACH preamble formats can be signaled.

According to a possible embodiment, the UE can be configured by higher-layers, such as RRC semi-static signaling, with slots with RACH resources and periodicity, which can be in addition to other RACH configuration signaling. The UE can assume the RACH resources are present in the configured slot if the UE is not configured to monitor a group common PDCCH in the slot or the UE may not decode a group common PDCCH in the slot if configured to monitor a group common PDCCH. In one example, the UE may further identify a whole or a part of semi-statically configured RACH resources which can be assumed by the UE to be always available, based on information of semi-static uplink/downlink configuration and/or actually transmitted SS blocks in a cell. If the UE decodes the group common PDCCH in the slot, the group common PDCCH can include an indication on whether the higher-layer configured RACH resource in the slot can be used for RACH transmission and/or can signal a new RACH resource in the slot the UE can use for transmission of RACH.

According to another possible embodiment for RACH configuration, a common RACH resource configuration of a handover target cell indicated in a handover command can be different from a common RACH resource configuration advertised in a System Information Block (SIB) of the handover target cell. A UE-specific RACH time/frequency resource for handover can be selected from the common RACH resource configuration indicated in the handover command. Configuring additional RACH slots for handover UEs can reduce the RACH related latency during handover, since a higher number of configured RACH slots can potentially increase actually available RACH resources. Thus, the common RACH resource configuration indicated in the handover command can have more RACH slots or more RACH time/frequency resources than the common RACH resource configuration indicated in the SIB. This can accommodate fast handover without impacting UEs in the target cell, since monitoring occasions for group common PDCCH for non-handover UEs in the target cell and the system information of the target cell may remain the same. According to a possible implementation, the common RACH resource configuration indicated in the handover command can include the common RACH resource configuration advertised in the SIB and an additional common RACH resource configuration that provides additional RACH time/frequency resources.

Figure 6:
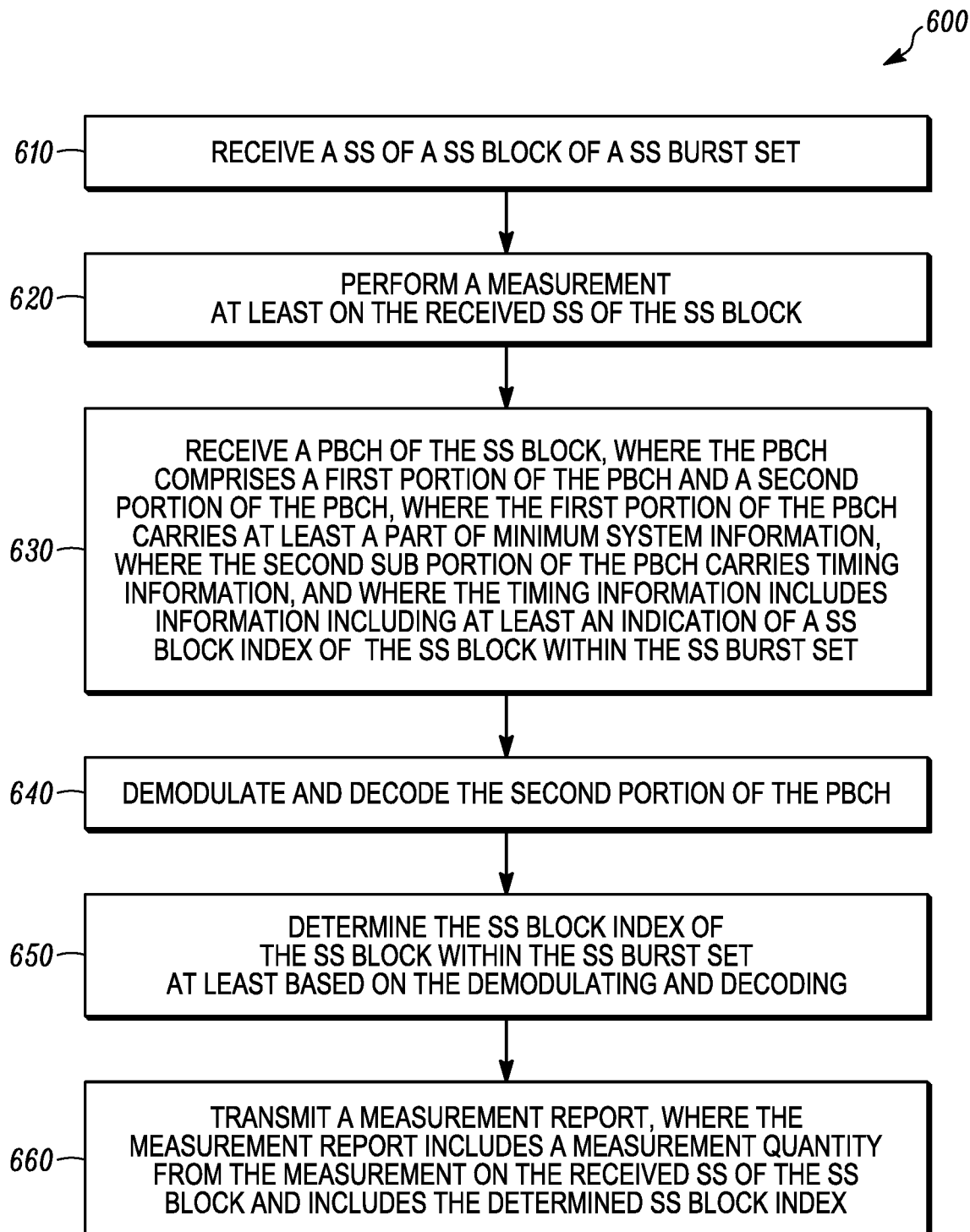
FIG. 6 is an example flowchart illustrating the operation of a wireless communication device according to a possible embodiment.

FIG. 6 is an example flowchart 600 illustrating the operation of a wireless communication device, such as the UE 110, according to a possible embodiment. At 610, SS of a SS block of a SS burst set can be received. At 620, a measurement can be performed at least on the received SS of the SS block. For example, mobility measurement can be performed that can include determining RSRP based on the received SS.

At 630, a PBCH of the SS block can be received. The PBCH can include a first portion of the PBCH and a second portion of the PBCH. According to a possible implementation, the first portion of the PBCH can be an M-PBCH and the second portion of the PBCH can be a S-PBCH. The first portion of the PBCH can be a first set of REs and the second portion of the PBCH can be a second set of REs. The first set of REs and the second set of REs can be mutually exclusive. Alternately, the first set of REs can at least partially overlap with the second set of REs. The second set of REs can include a part of PBCH OFDM symbols. The second set of REs can also include a part of a PBCH frequency band.

The first portion of the PBCH can carry at least a part of minimum system information. Minimum system information can be information needed to access a cell. The minimum system information can be in a MIB. The part of minimum system information can include an indication of a part of SFN information.

The second portion of the PBCH can carry timing information. The timing information can be in a STIB that includes a SS block index. The timing information can include information including at least an indication of a SS block index of the SS block within the SS burst set. The part of minimum system information and the timing information can be separately encoded and modulated to separate sets of modulation symbols. The part of minimum system information and the timing information can also be jointly encoded. For example, the part of minimum system information and the timing information can be jointly encoded into a common set of modulation symbols, such as occupying a common set of resource elements.

At 640, the second portion of the PBCH can be demodulated and decoded. The first portion of the PBCH can also be demodulated and decoded. Decoding the first portion of the PBCH can include canceling interference from the second portion of the PBCH. According to a possible implementation, the jointly encoded bits of the part of minimum system information can be encoded into a first self-decodable unit. The jointly encoded bits of the timing information can be encoded into second self-decodable unit. The part of minimum system information can be decoded from the first self-decodable unit. The timing information can be decoded from the second self-decodable unit.

At 650, the SS block index of the SS block within the SS burst set can be determined at least based on the demodulating and decoding. At 660, a measurement report can be transmitted. The measurement report can include a measurement quantity from the measurement on the received SS of the SS block and can include the determined SS block index.

Figure 7:
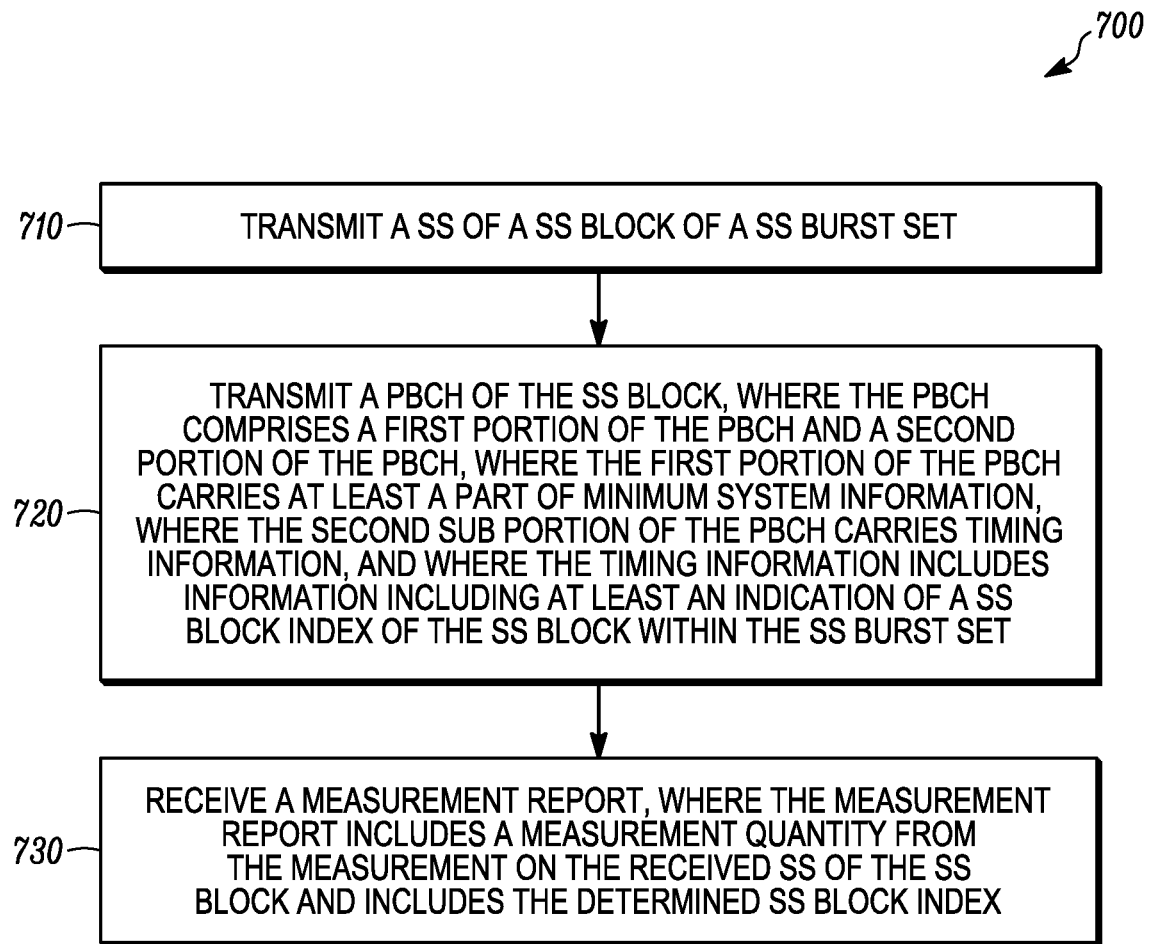
FIG. 7 is an example flowchart illustrating the operation of a wireless communication device according to a possible embodiment.

FIG. 7 is an example flowchart 700 illustrating the operation of a wireless communication device, such as the network entity 120, according to a possible embodiment. At 710, a SS of a SS block of a SS burst set can be transmitted. For example, the SS of the SS block of the SS burst set can be configured and transmitted.

At 720, a PBCH of the SS block can be transmitted. For example, the PBCH can be configured and transmitted. The PBCH can include a first portion of the PBCH and a second portion of the PBCH. The first portion of the PBCH can include a first set of REs and the second portion of the PBCH can include a second set of REs. The second set of REs can include a part of PBCH OFDM symbols. The second set of REs can also include a part of a PBCH frequency band. The first set of REs and the second set of REs can be mutually exclusive. Alternately, the first set of REs can at least partially overlap with the second set of REs. The first portion of the PBCH can cancel interference from the second portion of the PBCH when the first portion of the PBCH is decoded.

The first portion of the PBCH can carry at least a part of minimum system information. The part of minimum system information can include an indication of a part of SFN information. The second portion of the PBCH can carry timing information.

The timing information can include information including at least an indication of a SS block index of the SS block within the SS burst set. The part of minimum system information and the timing information can be separately encoded and modulated to separate sets of modulation symbols. The part of minimum system information and the timing information can also be jointly encoded. Jointly encoded bits of the part of minimum system information can be encoded into a first self-decodable unit. Jointly encoded bits of the timing information can be encoded into second self-decodable unit.

At 730, a measurement report can be received. The measurement report can include a measurement quantity from a measurement on the transmitted SS of the SS block. The measurement report can also include a SS block index of the SS block within the SS burst set.

Figure 8:
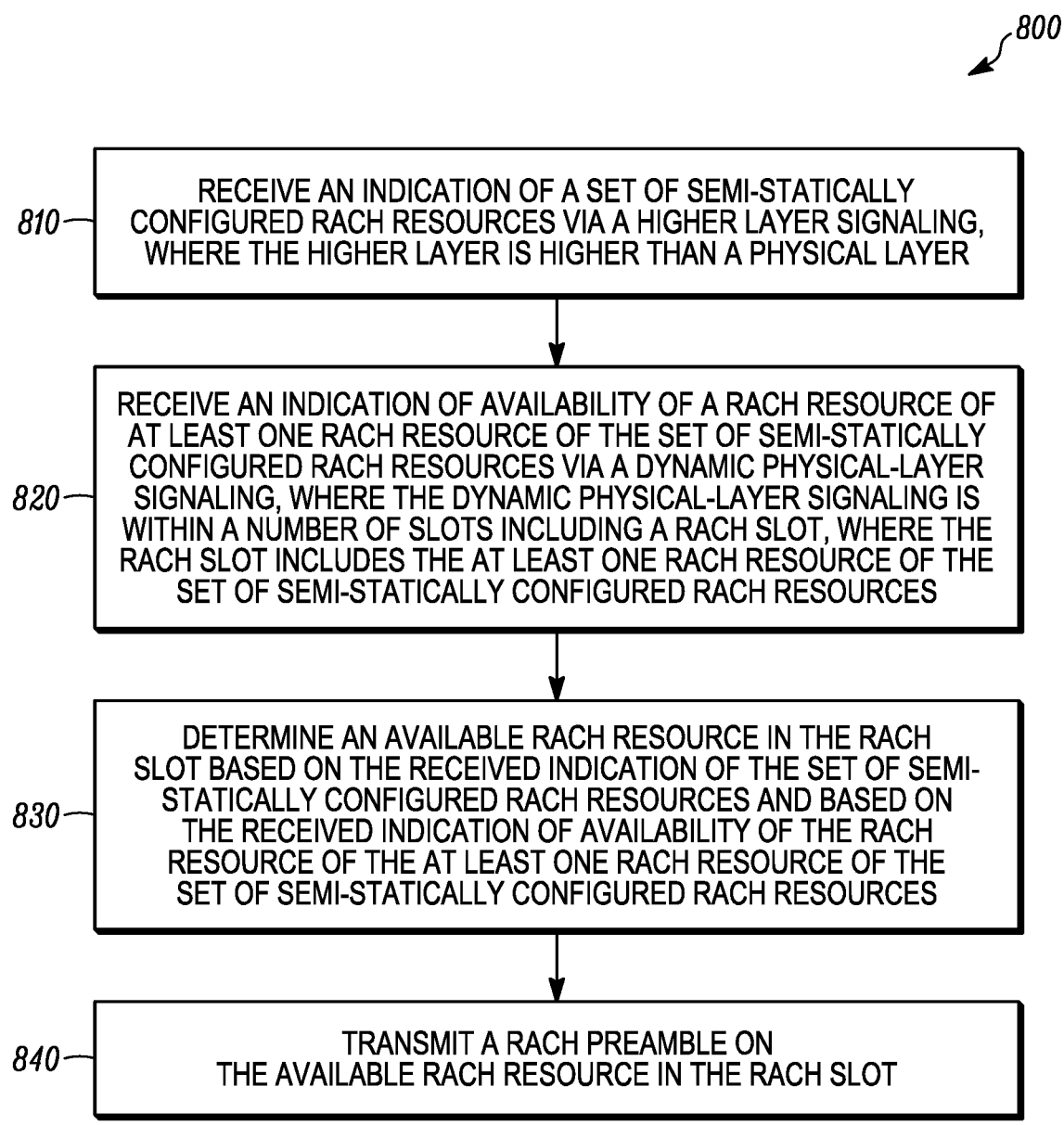
FIG. 8 is an example flowchart illustrating the operation of a wireless communication device according to a possible embodiment.

FIG. 8 is an example flowchart 800 illustrating the operation of a wireless communication device, such as the UE 110, according to a possible embodiment. At 810, an indication of a set of semi-statically configured RACH resources can be received via a higher layer signaling. The higher layer can be higher than a physical layer. For example, the higher layer signaling can be RRC signaling. The set of semi-statically configured RACH resources can be common RACH resources. Common RACH resources can be cell-specific and can be common among multiple UEs.

The higher layer signaling can also include information of a set of RACH slots. The higher layer signaling can additionally include at least one RACH preamble format. Each of the at least one RACH preamble format can define at least a number of RACH symbols per RACH preamble and a number of RACH preambles per RACH preamble format. The RACH symbols can be OFDM or SC-FDMA symbols.

At 820, an indication of availability of a RACH resource of at least one RACH resource of the set of semi-statically configured RACH resources can be received via a dynamic physical-layer signaling. The dynamic physical-layer signaling can be DCI in a group-common PDCCH. The group common PDCCH can be spatially quasi-co-located with at least one of one or more Synchronization Signal and PBCH blocks and one or more channel state information-reference signal (CSI-RS) resources that are associated with the RACH resource. The dynamic physical-layer signaling can be within a number of slots including a RACH slot. The number of slots can be two, can be one, or can be any other number of slots including the RACH slot. For example, the number of slots can be two and the RACH slot in the two slots can be slot n and the other slot in the two slots can be slot n–1. According to a possible embodiment, the indication of availability of the RACH can be received via a dynamic physical-layer signaling in the RACH slot. The RACH slot can include the at least one RACH resource of the set of semi-statically configured RACH resources.

An indication of a number of frequency domain multiplexed RACH occasions can be also received at a given time instance. Each RACH occasion can be associated with at least one SS block. RACH resources can include time, frequency, and preambles of RACHs, whereas RACH occasions can include time and frequency of RACHs. An indication of a number of time domain multiplexed RACH occasions can additionally be received in the RACH slot.

An indication of a RACH preamble format selected from the at least one RACH preamble format for the available RACH resource can also be received. The indication of a RACH preamble format can be received via the dynamic physical-layer signaling.

Information of a number of uplink symbols in the RACH slot can additionally be received. A RACH preamble format can be selected from the at least one RACH preamble format for the available RACH resource based on the received information of the number of uplink symbols in the RACH slot.

According to a possible implementation, the set of semi-statically configured RACH resources can be a first set of semi-statically configured RACH resources for a serving cell. An indication of a second set of semi-statically configured RACH resources for a handover target cell can be received. The indication of a second set of semi-statically configured RACH resources can be received in a handover command message. The second set of semi-statically configured RACH resources can be different from a third set of semi-statically configured RACH resources for at least one RACH resource. The third set of semi-statically configured RACH resources can be broadcast in a SIB of the handover target cell.

The second set of semi-statically configured RACH resources can include a first number of RACH slots and the third set of semi-statically configured RACH resources can include a second number of RACH slots, where the first number of RACH slots can be different from the second number of RACH slots. For example, the first number of RACH slots can be larger than the second number of RACH slots.

The third set of semi-statically configured RACH resources can be a subset of the second set of semi-statically configured RACH resources. For example, the total resources in the third set of semi-statically configured RACH resources can be different from the total resources in the second set of semi-statically configured RACH resources. To elaborate, the second set of semi-statically configured RACH resources can include at least one RACH resource that is not in the third set of semi-statically configured RACH resources.

At 830, an available RACH resource in the RACH slot can be determined based on the received indication of the set of semi-statically configured RACH resources and based on the received indication of availability of the RACH resource of the at least one RACH resource of the set of semi-statically configured RACH resources.

At 840, a RACH preamble can be transmitted on the available RACH resource in the RACH slot. For example, available RACH resource can be associated with a set of RACH preambles and the transmitted RACH preamble can be from the set of RACH preambles. Transmitting can include transmitting the RACH preamble on the available RACH resource in the RACH slot according to the indicated RACH preamble format.

Transmitting can also include transmitting the RACH preamble on the available RACH resource in the RACH slot according to the selected RACH preamble format. For example, the information of a number of uplink symbols in a RACH slot can be received in a physical layer signaling from a serving cell, and the RACH preamble format can be selected based on the received information of the number of uplink symbols in the RACH slot.

Figure 9:
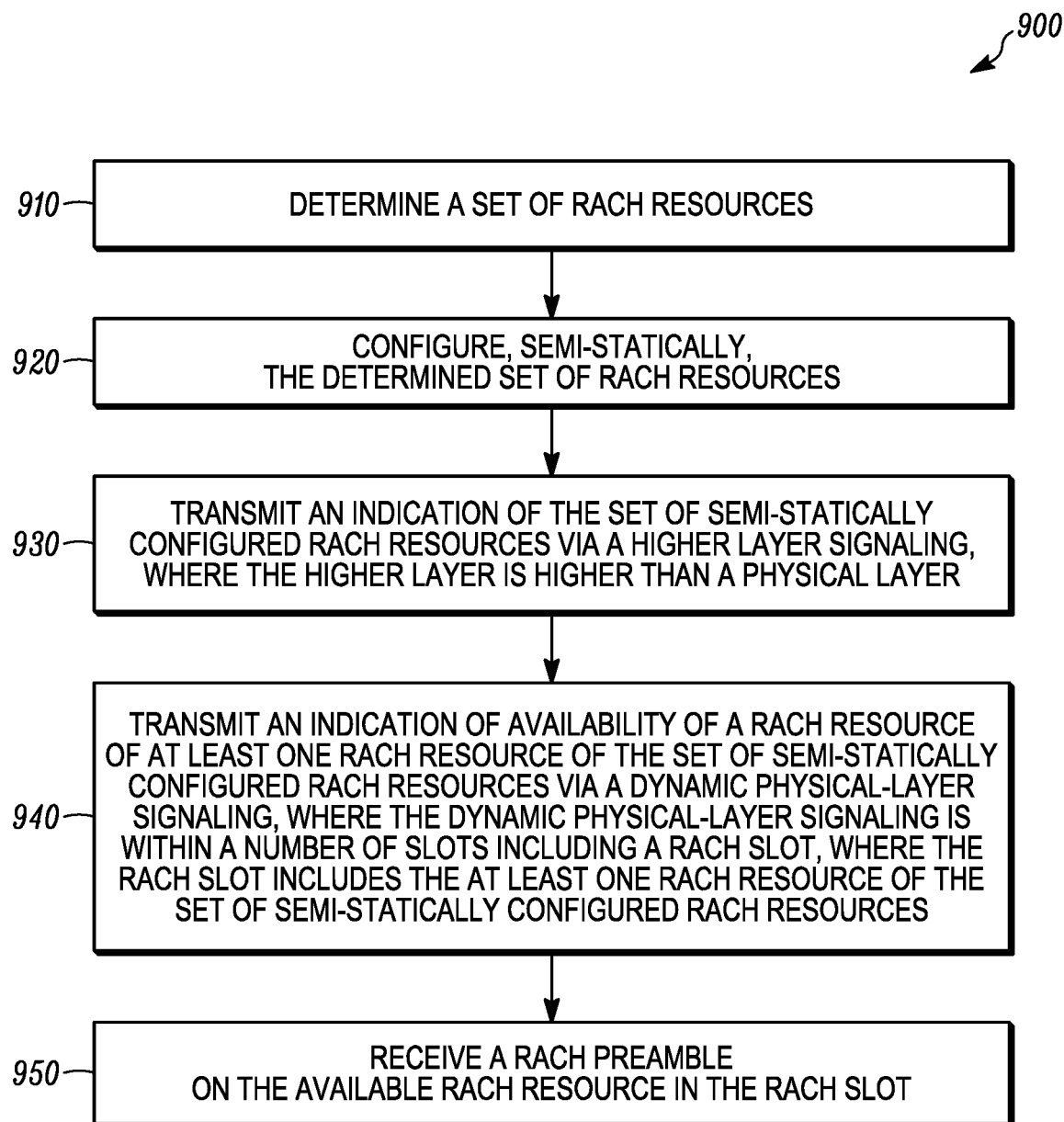
FIG. 9 is an example flowchart illustrating the operation of a wireless communication device according to a possible embodiment.

FIG. 9 is an example flowchart 900 illustrating the operation of a wireless communication device, such as the network entity 120, according to a possible embodiment. At 910, a set of RACH resources can be determined. At 920, the determined set of RACH resources can be configured semi-statically. The set of semi-statically configured RACH resources can be common RACH resources.

At 930, an indication of the set of semi-statically configured RACH resources can be transmitted via a higher layer signaling. The higher layer can be higher than a physical layer. The higher layer signaling can include information of a set of RACH slots. The higher layer signaling can also include at least one RACH preamble format. Each of the at least one RACH preamble format can define at least a number of RACH symbols per RACH preamble and a number of RACH preambles per RACH preamble format.

The set of semi-statically configured RACH resources can be a first set of semi-statically configured RACH resources for a serving cell. An indication of a second set of semi-statically configured RACH resources for a handover target cell can additionally be transmitted. The indication of the second set of semi-statically configured RACH resources can be transmitted in a handover command message. The second set of semi-statically configured RACH resources can be different from a third set of semi-statically configured RACH resources for at least one RACH resource. The third set of semi-statically configured RACH resources can be broadcast in a system information block (SIB) of the handover target cell.

The second set of semi-statically configured RACH resources can be a first number of RACH slots and the third set of semi-statically configured RACH resources can be a second number of RACH slots. The first number of RACH slots can be different from the second number of RACH slots. The first number can be larger than the second number. The third set of semi-statically configured RACH resources can be a subset of the second set of semi-statically configured RACH resources.

At 940, an indication of availability of a RACH resource of at least one RACH resource of the set of semi-statically configured RACH resources can be transmitted via a dynamic physical-layer signaling. The dynamic physical-layer signaling can be within a number of slots including a RACH slot. The dynamic physical-layer signaling can be DCI in a group-common PDCCH. The group common PDCCH can be spatially quasi-co-located with at least one of one or more Synchronization Signal and PBCH blocks and one or more CSI-RS resources that are associated with the RACH resource. The RACH slot can include the at least one RACH resource of the set of semi-statically configured RACH resources.

An indication of a RACH preamble format selected from the at least one RACH preamble format for the available RACH resource can additionally be transmitted. The indication of a RACH preamble format can be transmitted via the dynamic physical-layer signaling.

An indication of a number of frequency domain multiplexed RACH occasions at a given time instance can be also transmitted. Each RACH occasion can be associated with at least one SS block. Also, an indication of a number of time domain multiplexed RACH occasions in the RACH slot can be transmitted. Information of a number of uplink symbols in the RACH slot can further be transmitted.

At 950, a RACH preamble can be received on the available RACH resource of the set of semi-statically configured RACH resources in the RACH slot. The RACH preamble can be received on the available RACH resource in the RACH slot according to the indicated RACH preamble format. The RACH preamble can be received on the available RACH resource in the RACH slot according to a selected RACH preamble format from the at least one RACH preamble format for the available RACH resource based on the transmitted information of the number of uplink symbols in the RACH slot.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 10:
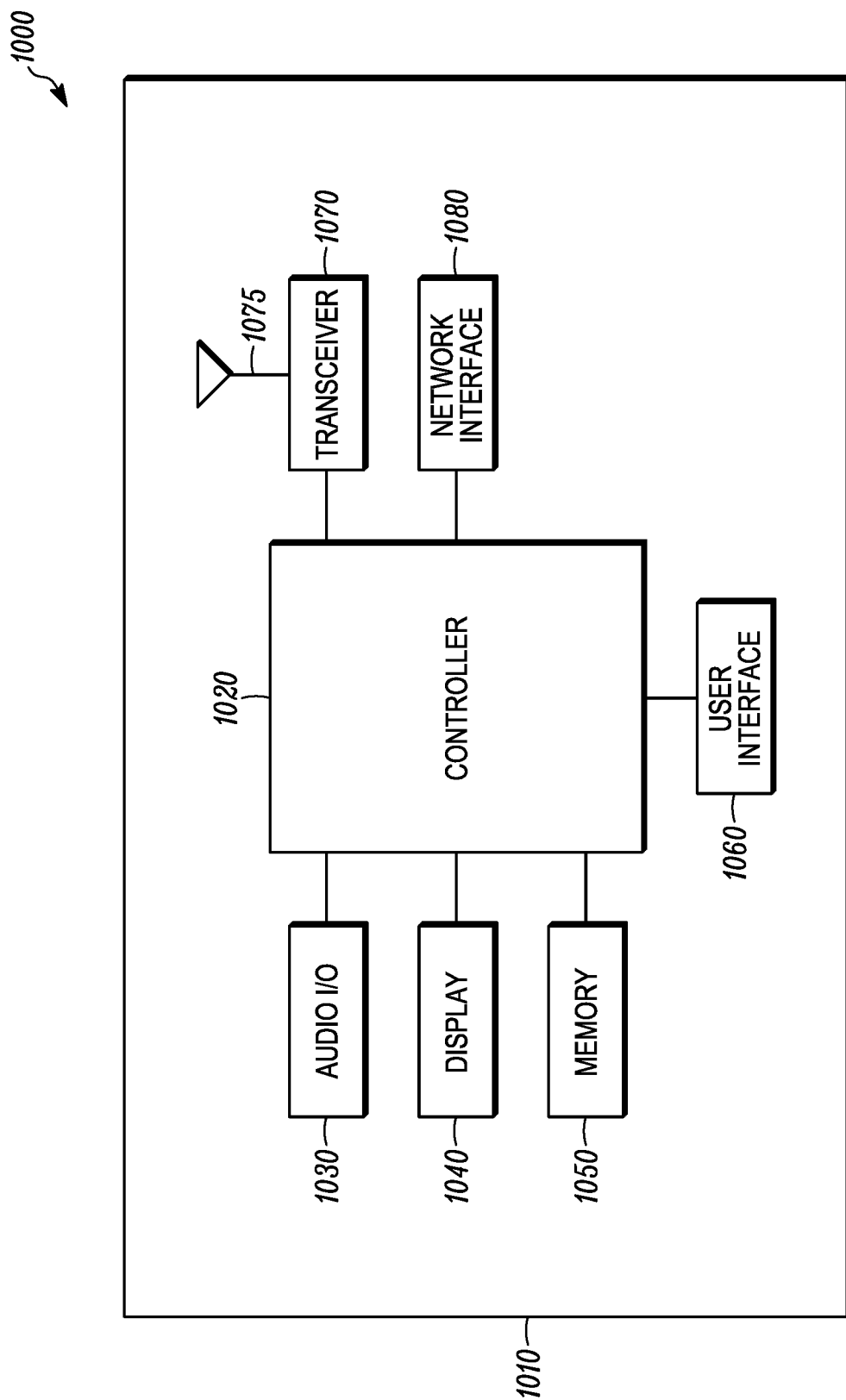
FIG. 10 is an example block diagram of an apparatus according to a possible embodiment.

FIG. 10 is an example block diagram of an apparatus 1000, such as the UE 110, the network entity 120, or any other wireless communication device disclosed herein, according to a possible embodiment. The apparatus 1000 can include a housing 1010, a controller 1020 coupled to the housing 1010, audio input and output circuitry 1030 coupled to the controller 1020, a display 1040 coupled to the controller 1020, a transceiver 1070 coupled to the controller 1020, at least one antenna 1075 coupled to the transceiver 1070, a user interface 1060 coupled to the controller 1020, a memory 1050 coupled to the controller 1020, and a network interface 1080 coupled to the controller 1020. The apparatus 1000 may not necessarily include all of the illustrated elements for different embodiments of the present disclosure. The apparatus 1000 can perform the methods described in all the embodiments.

The display 1040 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1070 can be one or more transceivers that can include a transmitter and/or a receiver. The audio input and output circuitry 1030 can include a microphone, a speaker, a transducer, or any other audio input and output circuitry. The user interface 1060 can include a keypad, a keyboard, buttons, a touch pad, a joystick, a touch screen display, another additional display, or any other device useful for providing an interface between a user and an electronic device. The network interface 1080 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1050 can include a Random Access Memory (RAM), a Read Only Memory (RON), an optical memory, a solid state memory, a flash memory, a removable memory, a hard drive, a cache, or any other memory that can be coupled to an apparatus.

The apparatus 1000 or the controller 1020 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1050 or elsewhere on the apparatus 1000. The apparatus 1000 or the controller 1020 may also use hardware to implement disclosed operations. For example, the controller 1020 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1020 may be any controller or processor device or devices capable of operating an apparatus and implementing the disclosed embodiments. Some or all of the additional elements of the apparatus 1000 can also perform some or all of the operations of the disclosed embodiments.

According to a possible embodiment as a UE, the transceiver 1070 can receive a SS of a SS block of a SS burst set. The controller 1020 can perform a measurement at least on the received SS of the SS block.

The transceiver 1070 can receive a PBCH of the SS block. The PBCH can include a first portion of the PBCH and a second portion of the PBCH. The first portion of the PBCH can carry at least a part of minimum system information. The part of minimum system information can include an indication of a part of SFN information. The second portion of the PBCH can carry timing information. The timing information can include information including at least an indication of a SS block index of the SS block within the SS burst set. The first portion of the PBCH can include a first set of resource elements REs and the second portion of the PBCH can include a second set of REs. The first set of REs and the second set of REs can be mutually exclusive. Alternately, the first set of REs can at least partially overlap with the second set of REs. The controller 1020 can demodulate and decode the first portion of the PBCH. Decoding the first portion of the PBCH can include canceling interference from the second portion of the PBCH.

The part of minimum system information and the timing information can be separately encoded and modulated to separate sets of modulation symbols. The part of minimum system information and the timing information can also be jointly encoded. For example, jointly encoded bits of the part of minimum system information can be encoded into a first self-decodable unit. Jointly encoded bits of the timing information can be encoded into second self-decodable unit.

The controller 1020 can demodulate and decode the second portion of the PBCH. The controller 1020 can decode the part of minimum system information from the first self-decodable unit. The controller 1020 can decode the timing information from the second self-decodable unit.

The controller 1020 can determine the SS block index of the SS block within the SS burst set at least based on the demodulating and decoding. The transceiver 1070 can transmit a measurement report. The measurement report can include a measurement quantity from the measurement on the received SS of the SS block and includes the determined SS block index.

According to a possible embodiment as a network entity, the controller 1020 can configure a SS of a SS block of a SS burst set. The transceiver 1070 can transmit the SS of the SS block of the SS burst set. The transceiver 1070 can transmit a PBCH of the SS block. The PBCH can include a first portion of the PBCH and a second portion of the PBCH. The first portion of the PBCH can carry at least a part of minimum system information. The second portion of the PBCH can carry timing information. The timing information can include information including at least an indication of a SS block index of the SS block within the SS burst set. The transceiver 1070 can receive a measurement report. The measurement report can include a measurement quantity from a measurement on the transmitted SS of the SS block and can include a SS block index of the SS block within the SS burst set.

According to a possible embodiment as a UE, the transceiver 1070 can receive an indication of a set of semi-statically configured RACH resources via a higher layer signaling, where the higher layer is higher than a physical layer. The higher layer signaling can include at least one RACH preamble format. Each of the at least one RACH preamble format can define at least a number of RACH symbols per RACH preamble and a number of RACH preambles per RACH preamble format.

The transceiver 1070 can also receive an indication of availability of a RACH resource of at least one RACH resource of the set of semi-statically configured RACH resources via a dynamic physical-layer signaling. The dynamic physical-layer signaling can be within a number of slots including a RACH slot. The RACH slot can include the at least one RACH resource of the set of semi-statically configured RACH resources.

The transceiver 1070 can additionally receive an indication of a number of frequency domain multiplexed RACH occasions at a given time instance. Each RACH occasion can be associated with at least one SS block. The transceiver 1070 can further receive an indication of a RACH preamble format selected from the at least one RACH preamble format for the available RACH resource. The indication of a RACH preamble format can be received via the dynamic physical-layer signaling.

The transceiver 1070 can also receive information of a number of uplink symbols in the RACH slot. The controller 1020 can select a RACH preamble format from the at least one RACH preamble format for the available RACH resource based on the received information of the number of uplink symbols in the RACH slot.

The controller 1020 can determine an available RACH resource in the RACH slot based on the received indication of the set of semi-statically configured RACH resources and based on the received indication of availability of the RACH resource of the at least one RACH resource of the set of semi-statically configured RACH resources.

The transceiver 1070 can transmit a RACH preamble on the available RACH resource in the RACH slot. Transmitting can include transmitting the RACH preamble on the available RACH resource in the RACH slot according to the indicated RACH preamble format. Transmitting can also include transmitting the RACH preamble on the available RACH resource in the RACH slot according to the selected RACH preamble format.

According to a possible implementation, the set of semi-statically configured RACH resources can be a first set of semi-statically configured RACH resources for a serving cell. The transceiver 1070 can receive an indication of a second set of semi-statically configured RACH resources for a handover target cell. The indication of the second set of semi-statically configured RACH resources is received in a handover command message. The second set of semi-statically configured RACH resources can be different from a third set of semi-statically configured RACH resources for at least one RACH resource. The third set of semi-statically configured RACH resources can be broadcast in a system information block (SIB) of the handover target cell.

According to another possible embodiment as a network entity, the controller 1020 can determine a set of random access channel resources and configure, semi-statically, the determined set of random access channel resources. The transceiver 1070 can transmit an indication of the set of semi-statically configured RACH resources via a higher layer signaling. The higher layer can be higher than a physical layer. The transceiver 1070 can transmit an indication of availability of a RACH resource of at least one RACH resource of the set of semi-statically configured RACH resources via a dynamic physical-layer signaling. The dynamic physical-layer signaling can be within a number of slots including a RACH slot. The RACH slot can include the at least one RACH resource of the set of semi-statically configured RACH resources. The transceiver 1070 can receive a RACH preamble on the available RACH resource of the set of semi-statically configured RACH resources in the RACH slot.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
   receiving a first configuration of a first set of random access channel occasions, where the first configuration of the first set of random access channel occasions is received in a handover command message from a first cell;
   receiving a second configuration of a second set of random access channel occasions of a second cell,
      wherein the second set of random access channel occasions is different from the first set of random access channel occasions, and
      wherein system information of the second cell includes the second configuration of the second set of random access channel occasions; and
   transmitting a random access channel preamble on a random access channel occasion, where at least one selected from the first set of random access channel occasions and the second set of random access channel occasions includes the random access channel occasion,
   wherein the first cell is different from the second cell.

2. The method according to claim 1, wherein the first cell is a serving cell and the second cell is a handover target cell.

3. The method according to claim 1,
   wherein the random access channel occasion is an available random access channel occasion of the second set of random access channel occasions, and
   wherein the method further comprises:
      receiving an indication of availability of the available random access channel occasion of the second set of random access channel occasions via a dynamic physical-layer signaling, where the dynamic physical-layer signaling is within a number of slots including a random access channel slot, wherein the random access channel slot includes at least one random access channel occasion of the second set of random access channel occasions including the random access channel occasion; and determining the available random access channel occasion in the random access channel slot based on the second configuration of the second set of random access channel occasions and based on the indication of availability of the available random access channel occasion of the second set of random access channel occasions.

4. The method according to claim 3, wherein the dynamic physical-layer signaling is downlink control information in a group-common physical downlink control channel.

5. The method according to claim 4, wherein the group common physical downlink control channel is spatially quasi-co-located with at least one of one or more synchronization signal and physical broadcast channel blocks and one or more channel state information-reference signal occasions that are associated with the random access channel occasion.

6. The method according to claim 1, wherein the first configuration of the first set of random access channel occasions includes information of a set of random access channel slots, where a random access channel slot of the set of random access channel slots includes at least one random access channel occasion of the first set of random access channel occasions.

7. The method according to claim 6, wherein the first configuration of the first set of random access channel occasions further includes an indication of a number of time domain multiplexed random access channel occasions in each random access channel slot of the set of random access channel slots.

8. The method according to claim 1, wherein the first configuration of the first set of random access channel occasions includes an indication of a number of frequency domain multiplexed random access channel occasions at a given time instance, where each random access channel occasion is associated with at least one synchronization signal and physical broadcast channel block.

9. The method according to claim 1,
wherein the first configuration of the first set of random access channel occasions includes information of a random access channel preamble format,
wherein the random access channel occasion is from the first set of random access channel occasions, and
wherein a duration of the random access channel preamble is determined based on the random access channel preamble format.

10. The method according to claim 1,
wherein the second configuration of the second set of random access channel occasions includes a configuration of at least one random access channel preamble format,
wherein the method further comprises receiving information of a random access channel preamble format selected from the at least one random access channel preamble format, where the information of a random access channel preamble format is received via a dynamic physical-layer signaling, and
wherein transmitting comprises transmitting the random access channel preamble on the random access channel occasion according to the received random access channel preamble format.

11. The method according to claim 10, further comprising:
receiving information of a number of uplink symbols in a random access channel slot, where the random access channel slot includes at least the random access channel occasion; and
selecting a random access channel preamble format from the at least one random access channel preamble format for the random access channel occasion based on the received information of the number of uplink symbols in the random access channel slot,
wherein transmitting comprises transmitting the random access channel preamble on the random access channel occasion in the random access channel slot according to the selected random access channel preamble format.

12. The method according to claim 1, wherein the first set of random access channel occasions is a subset of the second set of random access channel occasions.

13. The method according to claim 1, wherein the second set of random access channel occasions is a subset of the first set of random access channel occasions.

14. The method according to claim 1, wherein the first set of random access channel occasions comprises a first number of random access channel slots and the second set of random access channel occasions comprises a second number of random access channel slots, where the first number of random access channel slots is different from the second number of random access channel slots.

15. The method according to claim 14, wherein the first number is larger than the second number.

16. An apparatus comprising:
a controller that controls operations of the apparatus; and
a transceiver coupled to the controller, where the transceiver
receives a first configuration of a first set of random access channel occasions, where the first configuration of the first set of random access channel occasions is received in a handover command message from a first cell,
receives a second configuration of a second set of random access channel occasions of a second cell,
wherein the second set of random access channel occasions is different from the first set of random access channel occasions, and
wherein system information of the second cell includes the second configuration of the second set of random access channel occasions, and
transmits a random access channel preamble on a random access channel occasion, where at least one selected from the first set of random access channel occasions and the second set of random access channel occasions includes the random access channel occasion,
wherein the first cell is different from the second cell.

17. The apparatus according to claim 16, wherein the first cell is a serving cell and the second cell is a handover target cell.

18. The apparatus according to claim 16,
wherein the random access channel occasion is an available random access channel occasion of the second set of random access channel occasions, and
wherein the transceiver
receives an indication of availability of the available random access channel occasion of the second set of random access channel occasions via a dynamic physical-layer signaling, where the dynamic physical-layer signaling is within a number of slots including a random access channel slot, where the random access channel slot includes at least one random access channel occasion of the second set of random access channel occasions including the random access channel occasion, and determines the available random access channel occasion in the random access channel slot based on the second configuration of the second set of random access channel occasions and based on the indication of availability of the available random access channel occasion of the second set of random access channel occasions.

19. The apparatus according to claim 16, wherein the first configuration of the first set of random access channel occasions includes information of a set of random access channel slots, where a random access channel slot of the set of random access channel slots includes at least one random access channel occasion of the first set of random access channel occasions.

20. The apparatus according to claim 16, wherein the first configuration of the first set of random access channel occasions includes an indication of a number of frequency domain multiplexed random access channel occasions at a given time instance, where each random access channel occasion is associated with at least one synchronization signal and physical broadcast channel block.

\* \* \* \* \*